United States Patent [19]
Ishida

[11] Patent Number: 5,497,330
[45] Date of Patent: Mar. 5, 1996

[54] METHOD FOR RETAINING THE CORRECTION VALUE OF A CONTROL VARIABLE IN AN ENGINE CONTROL DEVICE

[75] Inventor: Yasuhiko Ishida, Hyogo, Japan

[73] Assignee: Mitsubishi Denki Kabushiki Kaisha, Tokyo, Japan

[21] Appl. No.: 255,898

[22] Filed: Jun. 7, 1994

Related U.S. Application Data

[63] Continuation of Ser. No. 838,688, Feb. 21, 1992, abandoned.

[30] Foreign Application Priority Data

Feb. 26, 1991 [JP] Japan .................................. 3-030586

[51] Int. Cl.⁶ ........................... G06F 19/00; G06F 7/00
[52] U.S. Cl. ...................... 364/431.11; 364/431.12; 364/424.04; 364/424.03; 364/132; 395/182.2; 123/339.23; 123/417; 123/486
[58] Field of Search .................. 364/431.12, 431.11, 364/431.01–431.1, 443, 449, 569, 492, 464.04, 705.07, 551.01, 707, 424.04, 424.03, 424.01, 132, 134, 177, 161, 165, 571.07, 525, DIG. 2; 123/479, 480, 417, 486, 425, 435, 672, 674, 339.23; 395/182.22

[56] References Cited

U.S. PATENT DOCUMENTS

| | | | |
|---|---|---|---|
| 4,236,215 | 11/1980 | Callahan et al. | 364/436 |
| 4,271,402 | 6/1981 | Kastura et al. | 364/431.12 |
| 4,307,455 | 12/1981 | Juhasz et al. | 364/424.04 |
| 4,348,729 | 9/1982 | Sasayama et al. | 364/431.12 |
| 4,551,803 | 11/1985 | Hosaka et al. | 364/431.05 |
| 4,580,222 | 4/1986 | Fujii | 364/431.12 |
| 4,730,256 | 3/1988 | Niimi et al. | 364/431.12 |
| 4,891,760 | 1/1990 | Kashiwazaki et al. | 364/449 |
| 4,972,340 | 11/1990 | Nakatsuru et al. | 364/431.12 |
| 4,980,845 | 12/1990 | Govekar | 364/550 |
| 4,992,775 | 2/1991 | Castle et al. | 340/525 |
| 5,016,180 | 5/1991 | Fujisawa | 364/431.04 |
| 5,276,619 | 1/1994 | Ohara et al. | 364/424.04 |

FOREIGN PATENT DOCUMENTS

| | | |
|---|---|---|
| 2907660 | 8/1979 | Germany . |
| 58-53184 | 11/1983 | Japan . |
| 61-43536 | 9/1986 | Japan . |

OTHER PUBLICATIONS

F. Muller, "Entwicklungstendenzen in der elektronischen Steuer–un Regeltecknik," *Der Elektroniker*, No. 3, Jan. 1978, EL25–EL31. (Jan. 1978).

*Primary Examiner*—Kevin J. Teska
*Assistant Examiner*—Jacques H. Louis-Jacques
*Attorney, Agent, or Firm*—Sughrue, Mion, Zinn, Macpeak & Seas; Richard C. Turner; Laura C. Brutman

[57] ABSTRACT

A method of storing a correction value of a control variable in an engine control device includes the steps of transferring a correction value stored in a RAM to an E²PROM by serial communication immediately after a power supply switch is turned off. The correction value stored in the E²PROM is then transferred back to the RAM immediately after the power supply circuit is turned on. In this way, when the engine control device is not in operation, the correction value is retained in the E²PROM.

1 Claim, 2 Drawing Sheets

METHOD FOR RETAINING THE CORRECTION VALUE OF A CONTROL VARIABLE IN AN ENGINE CONTROL DEVICE

This is a continuation of application Ser. No. 07/838,688 filed Feb. 21, 1992 now abandoned.

BACKGROUND OF THE INVENTION

1. Field of the Invention

The present invention relates to a correction value retaining method in an engine control device for controlling the operational state of an engine according to a control variable obtained by detecting the operational state of the engine, finding a correction value to correct the control variable based on the control result of the operational state, and storing the correction value in a volatile memory.

2. Description of the Related Art

A well-known type of engine control device controls the operational state of an engine according to a control variable obtained by detecting the operational state of the engine, determines a correction value to correct the control variable based on the control result of the operational state, corrects the control variable according to the correction value by itself, stores the correction value in a volatile memory, and retains the stored correction value after the operation of the engine control device is stopped.

FIG. 1 is a schematic structural view of an engine control device according to the prior art. A correction value found by a CPU 1 is stored in a RAM 2. Electric power is supplied from a battery 6 to the CPU 1 through a power supply switch 5 and a power supply circuit 3. Electric power From the battery 6 is also supplied to the RAM 2 through a power supply circuit 4. In other words, the conventional engine control device is supplied with electric power from two circuits, and one of the circuits continuously supplies power to the RAM 2 even after the power supply switch 5 is turned off. Therefore, it is possible to retain the correction value stored in the RAM 2 after the operation of the engine control device is stopped and to reuse the correction value in the next operation.

However, since supply of electric power from two circuits is necessary in such a conventional correction value retaining method, the number of components of the engine control device is increased, and thus costs are also increased.

Furthermore, since power is still supplied to the engine control device while the engine control device is not in operation, it is feared that a battery may become flat due to discharge over a long period of time.

If the power supply is cut off while the operation is stopped, for example, if a battery is detached or the battery voltage falls, no voltage is supplied to the volatile memory, data in the volatile memory is destroyed, and the correction value is erased.

Furthermore, in order to enhance reliability of the correction value stored in the volatile memory on the assumption that the power supply will be cut off when the engine control device is not in operation, it is necessary to provide a means which can determine immediately after the start of an operation whether or not power was normally supplied while no operation was being performed.

As described above, the method of retaining a correction value in the volatile memory by supplying electric power while the engine control device is not operated is disadvantageous in cost and reliability.

SUMMARY OF THE INVENTION

An object of the present invention is to provide a method of retaining a correction value of a control variable in an engine control device which transfers a correction value stored in a volatile memory to an electrically rewritable non-volatile memory by serial communication immediately after the power supply to the engine control device is cut off and transfers the correction value stored in the non-volatile memory back to the volatile memory again immediately after the supply of power to the engine control device is started.

Therefore, a correction value is retained by an electrically rewritable non-volatile memory, for example, an $E^2PROM$ while the operation of the engine control device is stopped.

According to the present invention, since the correction value stored in the volatile memory is transferred to an electrically rewritable non-volatile memory by serial communication immediately after the power supply to the engine control device is cut off, and the correction value stored in the non-volatile memory is transferred back to the volatile memory again immediately after the supply of power to the engine control device is started, the correction value is retained by the electrically rewritable non-volatile memory, for example, an $E^2PROM$, while the engine control device is not in operation. Thus, it is unnecessary to supply electric power to the engine control device while the operation is stopped, and hence the power supply circuit is simplified, resulting in lower costs.

Also, reliability of the retained correction value can be ensured, and a means for checking whether or not power was cut off when the operation was stopped can be omitted.

Serial communication with the electrically rewritable non-volatile memory can decrease the number of, for example, ports of a CPU.

Furthermore, since an operation of writing into the electrically rewritable non-volatile memory is performed only after the cutoff of power, it is possible to restrict the number of writing times accepted by the non-volatile memory to less than the upper limit and to prevent the reliability of the non-volatile memory from being compromised.

DESCRIPTION OF THE PREFERRED EMBODIMENT

A method for retaining a correction value in an engine control device according to the present invention will now be described in detail.

Figure 1:
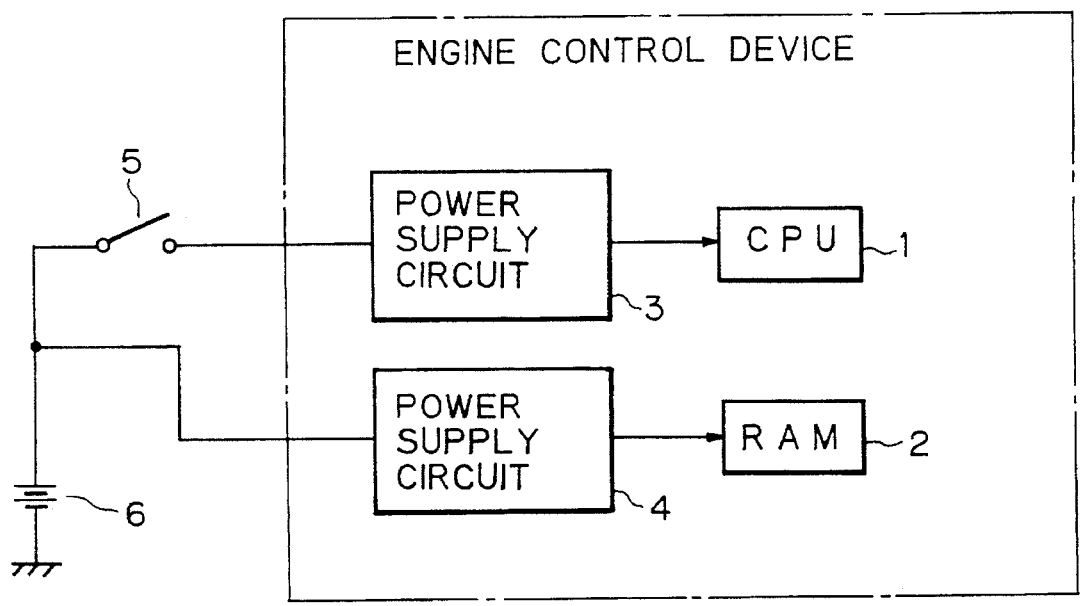
FIG. 1 is a schematic structural diagram of an example of an engine control device according to the prior art.
Figure 2:
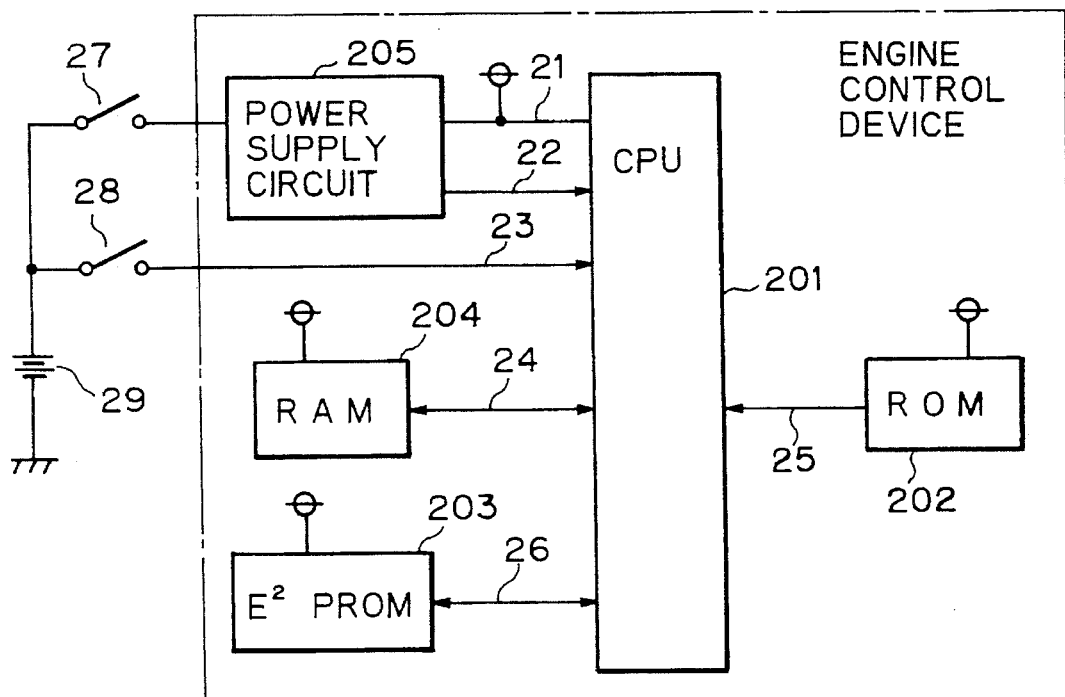
FIG. 2 is a schematic structural diagram of an engine control device employing a method for retaining a correction value of a control variable according to an embodiment of the present invention.

FIG. 2 is a schematic structural diagram showing one embodiment of an engine control device using the correction value retaining method.

Referring to FIG. 2, the engine control device is comprised of a CPU 201, a ROM (non-volatile memory) 202, an $E^2PROM$ 203 as an electrically rewritable non-volatile memory, a RAM (volatile memory) 204, a power supply circuit 205, a power supply switch 27, a memory reset switch 28, and a battery 29.

The CPU 201 calculates a control variable in accordance with the operational state of an engine, based on a prescribed control program and control data, and executes processes necessary for engine control. The ROM 202 stores the control data and control program used by the CPU 201. The RAM 204 stores the result of calculation by the CPU 201 and a correction value. The E²PROM 203 stores the correction value stored in the RAM 204 immediately after the power supply switch 27 is turned off (the power supply is cut off), and retains the correction value while the power is off. The correction value stored in the E²PROM 203 is transferred back to the RAM 204 again immediately after the program is started in response to the power on. The power supply circuit 205 supplies voltage to the ICs (the CPU 201, the ROM 202, the E²PROM 203, the RAM 204, and so on) based on the power from the battery 29. Furthermore, the power supply circuit 205 outputs a power off signal 22 to the CPU 201 when the power supply switch 27 is turned off, and continues to supply the voltage to the ICs for a predetermined time.

Numerals 24, 25 and 26 each denote a data communication line for communication with the CPU 201. The lines 24 and 25 performs data communication in parallel, and the line 26 performs serial data communication. The E²PROM 203 uses the line 26 of a serial communication type, thereby restricting the number of ports of the CPU necessary for the data communication to a minimum.

Besides the CPU 201, the ROM 202, the E²PROM 203, the RAM 204 and the power supply circuit 205, the engine control device has a driving circuit for driving an analog interface and a digital interface to detect the state of the engine, and an injector according to the control variable, (not shown).

Figure 3:
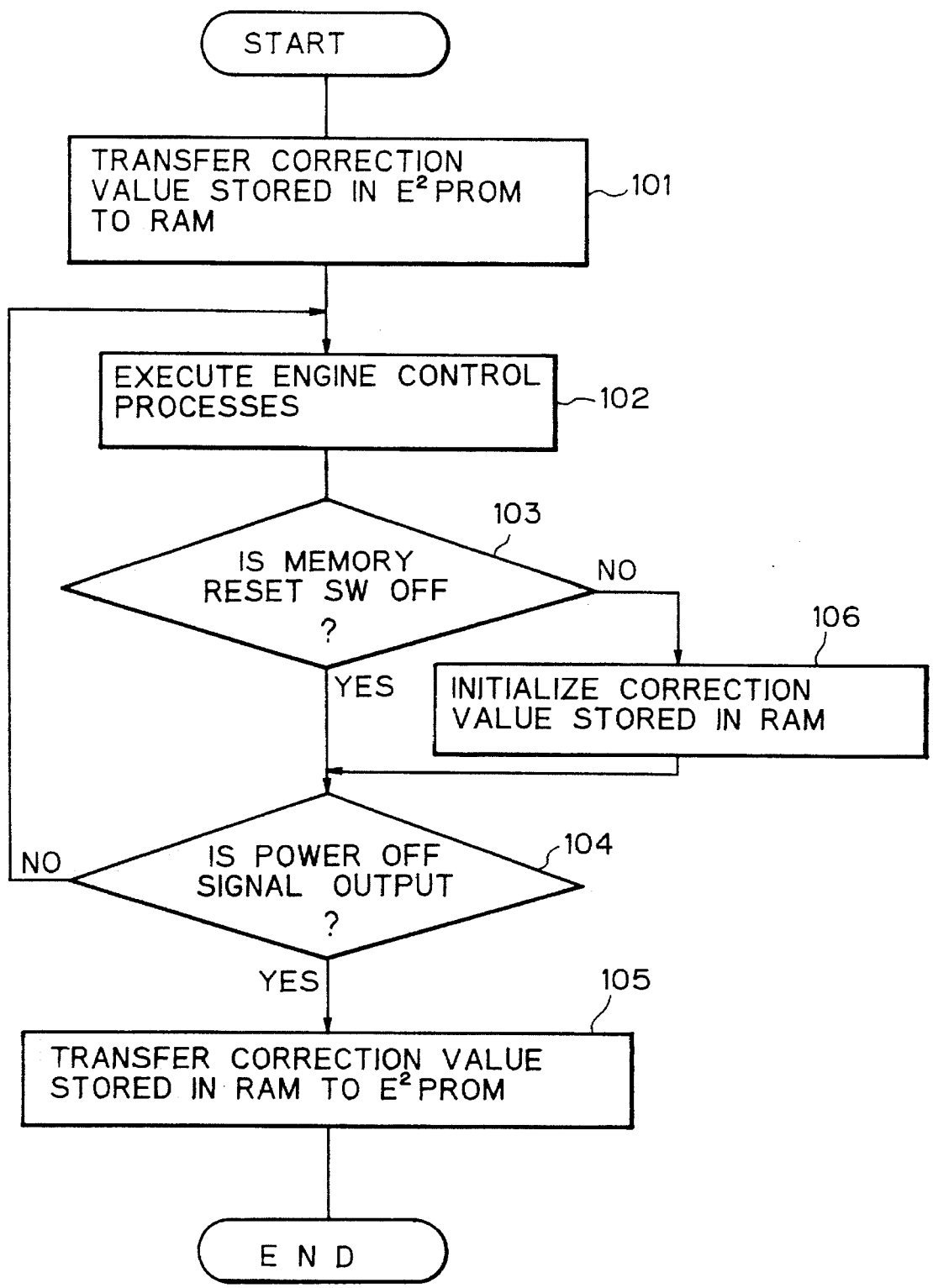
FIG. 3 is a flow chart explaining the process operation performed by a CPU in the engine control device shown in FIG. 2.

The operations characteristic of the engine control device, that is, the process operations of the CPU 201 to retain the correction value will be explained with reference to a flow chart shown in FIG. 3.

When the power supply switch 27 is turned on, the CPU 201 reads out a previous correction value stored in the E²PROM 203 immediately after the program is started, and transfers the correction value to the RAM 204. In Step 102, engine control processes are performed. For example, a control variable is found by detecting the state of the engine, and the operational state of the engine is controlled according to the result of the detection. Furthermore, a correction value for correcting the control variable is found based on the control result of the operational state, the control variable is corrected according to the correction value, and the correction value is stored in the RAM 204.

In Step 103, the initialization of the correction value is checked. If the memory reset switch 28 is on, the correction value stored in the RAM 204 is initialized in Step 106. If the memory reset switch 28 is off in Step 103, the correction value is not initialized and Step 104 is executed. In Step 104, a power off signal 22 output from the power supply circuit 205 is checked. If the power off signal 22 is not output, Step 102 is repeated, and if the power off signal 22 is output, Step 105 is executed. In Step 105, the correction value is read out of the RAM 204 and stored in the E²PROM 203. When Step 105 is executed, all the operations are stopped, and the process is completed. The power is supplied by the voltage supply from the power supply circuit 205 for a predetermined time from when the power supply switch 27 is turned off to when Step 105 is finished.

What is claimed is:

1. A correction value retaining method in an engine control device for controlling an operational state of an engine according to a control variable obtained by detecting the operational state of said engine, finding a correction value for correcting said control variable based on a result of the control of the operational state, and storing said correction value in a volatile memory, comprising the steps of:

transferring said correction value stored in said volatile memory to an electrically rewritable non-volatile memory by serial communication only at a time immediately after power to said engine control device is cut off;

transferring said correction value stored in said non-volatile memory back to said volatile memory again only at a time immediately after the power to said engine control device is turned on; and initializing said correction value stored in said volatile memory by operating a switch disposed outside said engine control device.

* * * * *